United States Patent [19]

Nakano et al.

[11] Patent Number: 5,294,387
[45] Date of Patent: Mar. 15, 1994

[54] METHOD OF PRODUCING FIBER-REINFORCED AND PARTICLE-DISPERSION REINFORCED MULLITE COMPOSITE MATERIAL

[75] Inventors: Kikuo Nakano, Kasugai; Kenji Oshima, Nagoya; Misao Iwata, Nagoya; Takao Yamada, Nishikamo, all of Japan

[73] Assignee: Noritake Co., Limited, Nagoya, Japan

[21] Appl. No.: 761,657

[22] Filed: Sep. 18, 1991

Related U.S. Application Data

[60] Division of Ser. No. 668,676, Mar. 7, 1991, Pat. No. 5,077,243, which is a continuation of Ser. No. 373,061, Jun. 29, 1989, abandoned.

[30] Foreign Application Priority Data

Jul. 2, 1988 [JP] Japan ............... 63-165352
Jul. 2, 1988 [JP] Japan ............... 63-165353

[51] Int. Cl.$^5$ ..................... C04B 33/34; C04B 33/36
[52] U.S. Cl. .......................... 264/60; 264/65; 264/332; 501/95; 501/96; 501/90; 501/128
[58] Field of Search .............. 501/95, 96, 89, 90, 501/92, 128; 264/57, 63, 66, 60, 332; 65/18.1

[56] References Cited

U.S. PATENT DOCUMENTS

| | | | |
|---|---|---|---|
| 4,610,917 | 9/1986 | Yamamura et al. | 428/224 |
| 4,640,899 | 2/1987 | Hillig et al. | 501/5 |
| 4,677,082 | 6/1987 | Alford et al. | 501/88 |
| 4,764,195 | 8/1988 | Allaire et al. | 65/18.4 |
| 4,778,722 | 10/1988 | Yamamura et al. | 428/367 |
| 4,961,990 | 10/1990 | Yamada et al. | 428/240 |
| 5,011,799 | 4/1991 | Das Chaklander et al. | 501/89 |

FOREIGN PATENT DOCUMENTS

3066837 6/1992 European Pat. Off. .
89306683.7 6/1992 European Pat. Off. .

*Primary Examiner*—Mark L. Bell
*Assistant Examiner*—Michael Marcheschi
*Attorney, Agent, or Firm*—Fish & Richardson

[57] ABSTRACT

A fiber-reinforced ceramic composite material reinforced by particle dispersion with improved fracture toughness comprised of a mullite matrix, and fibers and same or different kind of ceramic fine particles both dispersed within the mullite matrix is produced by a method comprising: dispersing mullite particles forming a matrix in a solution dissolving an organometallic macromolecular substance to prepare an impregnating solution, continuously passing fibers through said impregnating solution to uniformly impregnate the fibers with said impregnating solution, laminating said fibers to provide a laminated body, converting the organometallic macromolecular substance within said laminated body into a nonmeltable state, and performing sintering (or press sintering) of said laminated body in an inert gas and/or nitrogen gas. By press sintering $K_{Ic}$ of 10 $MN/m^{3/2}$ or more is achieved.

28 Claims, 1 Drawing Sheet

5,294,387

METHOD OF PRODUCING FIBER-REINFORCED AND PARTICLE-DISPERSION REINFORCED MULLITE COMPOSITE MATERIAL

This application is a division of Ser. No. 07/668,676, filed Mar. 7, 1991, now U.S. Pat. No. 5,077,243, which is a continuation of Ser. No. 07/373,061, filed Jun. 29, 1989, now abandoned.

FIELD OF THE INVENTION

This invention relates to a mullite composite in which a fiber-reinforced mullite composite is further reinforced by particle dispersion, particularly the value of fracture toughness is significantly increased, and hence applications for cylinder liners and piston rings of reciprocating engines or turbine blades of gas turbine engines and the like, generally heat-resistant use with high toughness and strength, are being expected, arid a method of producing the same.

BACKGROUND

Ceramics have been attracting notice as a heat-resistant structural materials replacing metals, since they have heat-resistant and oxidation-resistant properties superior to those of metal materials, and are also excellent in heat-insulating property. However, since ceramics are constituted by covalent bond or ionic bond, and can not be deformed or expanded by dislocations as metal materials, there occur stress concentrations at minute defects within a material and flaws on a surface. Hence ceramics are easily broken and have disadvantages that they are very fragile and inferior in fracture toughness.

Mullite ($3Al_2O_3 \cdot 2SiO_2$) which has the heat-resistant property and is excellent in thermal-shock resistance shows a uniform thermal expansion and small variations in mechanical properties due to temperature, and has a strength nearly identical to that of silicon carbide at 1350° C., but it is inferior in the fracture toughness like other ceramics.

The resistance of a material against brittle fracture is generally indicated by the value of fracture toughness $K_{Ic}$. The $K_{Ic}$'s of conventional mullite and silicon nitride materials are 1.5–1.8 $MN/m^{3/2}$ and 5–7 $MN/m^{3/2}$, respectively, and these values are extremely low even compared with 34 $MN/m^{3/2}$ for aluminum alloys which are considered to be relatively fragile among metal materials. In order to apply ceramics for reciprocating engines or gas-turbine engines as engineering ceramics, it is necessary to increase the value of fracture toughness, and especially it is preferred to make that value not less than 10 $MN/m^{3/2}$.

Accordingly, in order to improve fragility of the structural ceramics, various techniques have been investigated. Among them, particle-dispersion reinforcing method in which various particles are mixed and dispersed within a ceramic matrix and fiber reinforcing method in which various kinds of fibers are dispersed within a ceramic matrix have been attracting notice.

Fibers for fiber-reinforced ceramics (termed hereinafter FRC) are roughly divided into a short-fiber type and a long-fiber type. As long fibers, there are glass fibers, metal fibers, carbon fibers, ceramic fibers and the like. Carbon fibers are suitable for a composite since they have high strength and high modulus of elasticity, but they have a disadvantage that they are not resistant against oxidation. Ceramic fibers, such as silicon carbide, alumina and the like, which are made by spinning organic raw materials and being subjected to heat treatment, have high melting points and are most frequently being used. Short fibers indicate whiskers which are needle-like single crystals or fibers chopped from a long fiber. Whiskers show ideal strength as fibers for FRC, but they have disadvantages that it is difficult to uniformly disperse them within a matrix and they are expensive.

As to ceramics for a matrix, many ceramics ranging from oxides to non-oxides, such as $Al_2O_3$, mullite, $ZrO_2$, $Si_3N_4$, SiC, glass and the like, have been tried to make composites with fibers.

As to patent references about fiber-reinforced ceramic materials, there are those about a sintered body in which silicon carbide short fibers are mixed with spinel ($MgO \cdot Al_2O_3$) (JP Patent Kokai Publication No. 62-119175 (1987)), a sintered body in which silicon carbide short fibers are mixed with alumina (JP Patent Kokai Publication No. 62-119174 (1987)), an SiC composite reinforced by carbon continuous fibers (JP Patent Kokai Publication No. 61-247663 (1986)), a ceramic composite material in which carbon fibers are added to a metal oxide or a metal carbide and sintered simultaneously with pressurizing (JP Patent Kokai Publication No. 50-136306 (1975)), a ceramic composite material reinforced by silicon carbide fibers (JP Patent Kokoku Publication No. 62-35996 (1987)) and the like.

The mechanism for the increase of fracture toughness in ceramics by particle dispersion is considered such that an amount energy for farther advancing a front end of a crack is dispersed or absorbed by particles for reinforcement in a certain manner, and a stress relaxation phenomenon occurs. As an example of the fracture-toughness relaxation, there is an example in which TiC particles are dispersed in $Si_3N_4$.

PROBLEMS TO BE SOLVED BY THE INVENTION

In providing the above-described composite materials, however, chemical compatibility whether or not fibers maintain a desired strength without reacting with a matrix at a sintering temperature, and physical compatibility whether or not a difference in coefficient of thermal expansion damages fibers have influence upon properties of a composite material, such as fracture toughness and the like. Hence, it is the current situation that values of fracture toughness as expected can not been obtained merely by fiber reinforcement or particle-dispersion reinforcement. Although fiber reinforcement has also been tried for mullite, no satisfactory results have not been obtained.

SUMMARY OF THE DISCLOSURE

The present invention has been made taking into consideration the problems of fiber-reinforced mullite composite materials as described above. It is an object of the present invention to provide a fiber-reinforced mullite composite material which is excellent in the value of fracture toughness and a method of producing the same.

The inventor has eagerly performed research for solving the above-described problems, and finally achieved a reinforced material which has both fiber reinforcement and particle-dispersion reinforcement.

That is, there is provided a fiber-reinforced mullite composite materials according to a first aspect of the present invention, in which particle-dispersion reinforcement is simultaneously performed with fiber reinforcement, consists essentially of a mullite matrix, fibers dispersed within the mullite matrix, and the same kind or a different kind of ceramic fine particles dispersed within the mullite matrix.

Furthermore, a method of producing the fiber-reinforced mullite composite material indicated in the first aspect of the present invention comprises the steps of:

(a) dispersing mullite particles forming a matrix in a solution dissolving an organometallic macromolecular substance to prepare an impregnating solution, (b) uniformly impregnating the fibers with the impregnating solution, (c) laminating the resultant fibers to provide a laminated body, (d) converting the organometallic macromolecular substance within the laminated body into a nonmeltable state, and (e) sintering the laminated body in a pressurized or a normal-pressure inert (preferably argon) gas and/or nitrogen gas atmosphere. Preferably the fibers are continuously passed through the impregnating solution for uniform impregnation. The term "converting into a nonmeltable state" represents converting the organometallic macromolecular substance from a thermoplastic state into a state not meltable at a high temperature. The "ceramic fine particles" have a particle size finer than that of starting mullite particles, i.e., the dispersed mullite particles dispersed in the impregnating solution.

According to a second aspect of the present invention, it is possible to provide a composite material having the value of fracture toughness $K_{Ic}$ of not less than 10 MN/m$^{3/2}$ which has been sintered by press sintering. Its production method is substantially identical to that of the first aspect, except that the press sintering is employed as the sintering step.

As a mechanism for the increase of fracture toughness in the particle dispersion, there has been a proposed concept of crack deflection. That is, due to differences in various properties, such as toughness, coefficient of thermal expansion and the like between a matrix and a dispersed phase, or due to the state of an interface between the matrix and the dispersed phase, or the like, a crack proceeds bent in a zigzag route around the dispersed phase. An amount of energy necessary for cause the crack to proceed is thereby consumed, and hence the fracture toughness increases.

A mechanism for the increase of fracture toughness by the fiber reinforcement is considered to be attributed to the generation of pull-out and deflection. That is, in the case of mixing whiskers as a dispersed phase, the whisker, is pulled (drawn) out of the matrix by an amount of a gap produced by the crack when a crack passes through a portion where there is a whisker. An amount of energy is consumed by the amount of work for pulling out the whisker, and hence fracture toughness is increased.

The present invention has been accomplished according to the achieved concept that the energy of fracture will be marvelously increased and the value of fracture toughness will significantly be increased, if it is alranged so that the above-described crack deflection and pull-out simultaneously and effectively occur.

As described above, in the fiber-reinforced mullite composite materials reinforced by particle dispersion which is characterized in that it consists essentially of a mullite matrix, fibers dispersed within the mullite matrix and the same kind or a different kind of ceramic fine particles dispersed within the ceramic matrix.

Since crack deflection occurs by the fine particles dispersed at grain boundaries of the mullite matrix grains to increase fracture toughness, and the energy of fracture is also increased by pull-out in which fibers dispersed within the matrix are pulled out, it becomes possible to significantly increase the value of fracture toughness as well as flexural strength.

Although conventional ceramics have various excellent properties, they are weak against abrupt change in strength, such as shock and the like, and hence they have been considered as fragile materials and their applications have been limited. I ti the ceramic composite material of the present invention, however, the value of fracture toughness $K_{Ic}$ as an index of fragility is significantly improved, and a composite material having the value of not less than 10 MN/m$^{3/2}$ can be obtained by the second aspect. Hence, applications for cylinder liners, piston rings and the like of reciprocating engines and applications for turbine blades of gas-turbine engines become satisfactorily possible. Generally, the present invention is suitable for heat resistant use where high shock resistance is required.

In the production method of the present invention, there is adopted the technique in which mullite particles as a matrix are mixed in a solution dissolving an organometallic macromolecular substance to provide an impregnating solution and the fibers are impregnated with the impregnating solution. Hence, when a laminated body of fibers is sintered in an inert atmosphere after converting the organometallic macromolecular substance into nonmeltable state, organic components dissipate due to thermal decomposition of the organometallic macromolecular substance, and fine carbides or nitrides are deposited at grain boundaries of the matrix. Accordingly, it is possible to obtain a fiber-reinforced ceramic composite material reinforced by particle dispersion.

Furthermore, since fibers are satisfactorily charged within a mullite matrix by press sintering of the second aspect, internal defects decrease arid the fracture toughness is significantly increased. In addition, where carbon fibers are used, secondary effects, such as increased oxidation-resistant property of carbon fibers, can also be expected since the organometallic macromolecular substance is coated on the carbon fibers and thin-film coating of silicon carbide or silicon nitride is performed by a thermochemical reaction.

DESCRIPTION OF THE PREFERRED EMBODIMENTS

Figure 1:
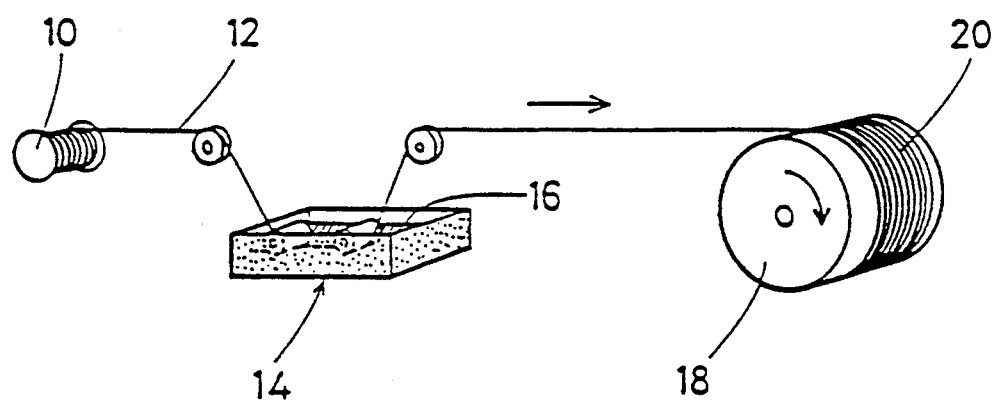
FIG. 1 is a diagram schematically showing a filament winding method.

Reinforcing fibers dispersed within a mullite matrix may be short fibers or long fibers. As the short fibers, it is possible to use glass fibers, metal fibers, carbon fibers and ceramic fibers, preferably carbon fibers, metal fibers and ceramic fibers, provided that those fibers have sufficient heat resistance upon sintering. Generally, the fibers should have heat resistance at least about 50° C. over the sintering temperature. According to the inventive method the fibers are coated with organometallic macromolecular substance which is then converted into a coating layer of ceramic fine particles. This coating layer serves as the oxidation resistant layer. In order to further improve oxidation-resistant property of those fibers or control the interface bonding with the mullite matrix, ceramic coating and the like may be applied by performing CVD coating on the surface of the fibers.

Dispersion of reinforced fibers within the mullite matrix is performed by a known method. In the case of long fibers, for example, there is employed any one of methods of providing an unsintered laminated body i.e., a method in which a fiber immersed into a mullite powder in the form of a slurry arid the fiber is successively wound around a dram (referred to as "filament winding method"), or a method in which fibers are arranged in a sheet-like fashion and matrix powders are alternately laminated (referred to as "laminating method"), the unsintered (green) laminated body being formed by a press mold, followed by a cold or warm pressing of the formed laminated body.

Generally, the ceramic fine particles have an average grain size less than the starting mullite particles, the latter approximately ranging from 1-2 μm (preferably 1-1.5 μm), while the mullite matrix grains generally ranges 1-4 μm (preferably 1-3 μm, more preferably 1-2 μm), both in the sintered body. The mullite particles at a stage just before the sintering have a particle size (agglomerated particles of very fine crystallites) smaller than the sintered mullite matrix grain size in view of grain growth through the sintering. The mullite crystallites are 0.1 μm or less in size (preferably 0.07 μm or less) in the Suitable material available.

FIG. 1 is a diagram schematically showing a filament winding method. A long fiber 12 unwound from a spool 10 is immersed in with a mullite powder which is held in an impregnating-solution reservoir 14 to apply the impregnating solution 16 on the surface of the long fiber 12, which is wound up around the drum 18. A laminated body 20 wound around the drum is removed from the drum 18 by being cut at an appropriate portion, further cut in a desired size, and laminated at a proper thickness. The laminated body 20 thus laminated is degreased if necessary, formed by to a press mold, and subjected to a cold or warm pressing.

A CVD method in which a ceramic matrix phase is formed within void in a fiber preform by a so-called chemical vapor deposition method, or a sol-gel method in which fibers are impregnated with a sol or gel-like macromolecular substance of a metal alkoxide and/or organosilicon and then subjected to thermal decomposition to obtain a metal oxide may also be utilized. This process can also provide mullite fine particles as the ceramic fine particles. In the case of short fibers, a slip casting method in which fibers are dispersed within a slurry of a mullite powder, the resultant slurry is poured into a gypsum mold, and a resultant molded body is taken out to be sintered is effective. The amount of fibers of 30-40% in volume % is suitable.

Fine particles to be dispersed within a mullite matrix may be particles of a kind different from or identical to the mullite matrix. In reinforcement of a matrix by fine particle dispersion, the maximum effect can be obtained at 20-25 volume %, as is expected from the knowledge on $Si_3N_4$-TiC.

From the understanding of crack deflection, it is effective that grain sizes of particles to be dispersed are present tinder uniform and fine states at grain boundaries of a matrix. As a technique for particle dispersion, a method of utilizing thermal decomposition of organometallic macromolecular substance is the most proper one, since it is difficult to perform a uniform dispersion and provide fine particles by a powder mixing method. That is, when organometallic macromolecular substances which include metal elements for forming ceramics, such as silicon, are subjected to thermal decomposition in an inert or nitrogen containing atmosphere, organic components are removed, and carbides, nitrides, carbonitrides, oxynitride etc., or mixtures thereof can be obtained. As the organometallic macromolecular substances, there are organosilicons such as polysiloxane, polysilazane, polycarbosilane, polysilastyrene and the like. For instance, polysilastyrene is commecially available a polymer of

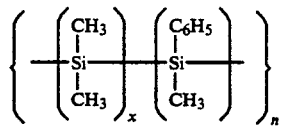

as its nominal component where X=0.8-1.3, the molecular weight being 8000-60000, preferably 8000-12000. Permethyl polysilane (oligomer), i.e., is expressed by a general formula

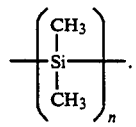

As the polysilazane, one having a molecular weight of about 3000 is available. Polycarbosilane produces silicon carbide as shown in formula (1), and silicon nitride is obtained from polysilazane as shown in formula (2):

$(SiH(CH_3.CH_2))_n \rightarrow SiC$     (1)

$(SiRR'NH_2)_n \rightarrow Si_3N_4$     (2)

A technique is employed in which organometallic macromolecular substance are coated on the surface of mullite particles, then converted into ceramics by a thermochemical reaction resulting in dispersed fine particles. For that purpose, organometallic macromolecular substances are dissolved in a solvent (toluene, xylene and the like), mullite particles as a matrix are therein mixed whereby organometallic macromolecular substances are coated on the surface of mullite particles.

In order to uniformly disperse fibers within the mullite matrix, a filament winding method is utilized. That is, a solution in which the matrix particles are mixed within a solution dissolving the organometallic macromolecular substance is made an impregnating solution, and the fibers are continuously passed therethrough to uniformly apply the impregnating solution on the surface of the fibers. Although the amount of fibers dispersed within a mullite matrix may be adjusted by viscosity of the impregnating solution and the passing speed of the fibers, the content of fibers is most preferably about 30-40% in volume %.

As to a material wound by the filament winding method, before main sintering, organometallic macromolecular substances are converted into an nonmeltable state in a flow of nitrogen gas or inert (e.g., argon) gas, or a mixed gas of nitrogen gas and ammonia gas at 600° (or 700°)-800° C., and vitrified (amorphous) ceramic layers as a precursor of fine particles are formed on the surface of mullite particles as the matrix former. For such conversion, the organometallic macromolecular substance may be subjected to three-dimensional crosslinking, in which case thermal decomposition may occur during the preheating step preceding or as a part of the sintering. After conversion of the organometallic macromolecular substance into the nonmeltable state, according to the first aspect, a formed body is sintered in an inert (e.g., argon) gas and/or nitrogen gas in a pressurized (for example, not more than about 9 kgf/cm$^2$ G) or nonpressurized gas flow.

According to the second aspect, after the conversion of the organometallic macromolecular substance into the nonmeltable state, the formed body is subjected to press sintering in an inert (e.g. argon) gas and/or nitrogen gas. Under the term press sintering, a sintering method is contemplated wherein mechanical pressure is applied to a mass to be sintered during the sintering, e.g., hot pressing (HP) or hot isostatic pressing (HIP). After masking the formed body with boron nitride, the formed body is held in a mold made of a heat-resistant material. such as carbon and the like, and press sintering (e.g., hot pressing) is performed. Generally a pressure of at least 10 kgf/cm$^2$ (preferably 100 kgf/cm$^2$ or more) may be applied.

The sintering (for both aspects) may be performed at a temperature 1450°–1750° C. (preferably 1450°–1700° C.). 1750° C. is just below the temperature at which mullite starts to decompose. In connection thereto, the fibers should be heat resistant at the sintering temperature employed ill a respective step, thus should have a heat resistance at 1500°–1750° C. or above (generally by at least about 50° C. higher).

In the fiber-reinforced mullite composite material reinforced by particle dispersion of the present invention, the crack deflection occurs and the fracture toughness is increased, since fine particles of a kind identical to or different from a matrix ceramics are dispersed at grain boundaries. That is, due to differences in various properties, such as toughness, coefficient of thermal expansion and the like, between the matrix and the dispersion phase of the fine particles and the state of interfaces between the matrix and the dispersion phase, and the like, a crack proceeds bent in a zigzag route around the dispersion phase. The energy necessary for crack proceeding is thereby consumed, energy of fracture is increased and the fracture toughness is increased.

In the production method of the present invention, since there is adopted the technique that mullite particles as a matrix are mixed in a solution dissolving the organometallic macromolecular substance to provide an impregnating solution and the fibers are impregnated with the impregnating solution, when a laminated body of fibers is sintered in an inert atmosphere after the conversion of the organometallic macromolecular substance into the nonmeltable state, organic components dissipate thermal decomposition of the organometallic macromolecular substance, arid fine carbides and/or nitrides are deposited at grain boundaries of the mullite. Hence, it is possible to obtain fiber-reinforced mullite composite material reinforced by the particle dispersion. Furthermore, since fibers are satisfactorily charged within a mullite matrix by press sintering, internal defects decrease and the fracture toughness is significantly increased.

Generally, the inventive composite material generally has a density of about 2.15 g/cm$^3$ or more in the first aspect, and 2.40 g/cm$^3$ or more in the second aspect.

Preferred embodiments of the present invention will be hereinafter explained, and the present invention will be disclosed more concretely with reference to examples. However, the present invention is not to be limitedly construed according to the description of the following embodiments.

EXAMPLE A1–A5 (FIRST ASPECT)

Example A1

42 g of Polysilastyrene made by Nippon Soda Co., Ltd. (Product Name; PSS-400 melting point of 150°–180° C., molecular weight of 8000–12000, of not stoichiometric composition (Si<<C)) was dissolved in 110 g of toluene as a solvent. The solution was held in a separately prepared polyethylene pot having an inner volume of 500 cc, and 98 g of mullite particles (made by KYORITSU CERAMIC MATERIALS CO., LTD, Product Name; EM mullite, average particle size (agglomerated) of 1–1.5 µm and a crystallite size of 0.07 µm) was added thereto. 300 g of high-alumina-quality cylinder-type pellets having 12.5 mmφ were added thereto, the lid of the pot was then closed, the pot was rotated at 50 r.p.m, and an impregnating solution was prepared followed by mixing for 16 hours.

The impregnating solution was poured into an impregnating-solution reservoir, a carbon fiber (HM-60, 2K grade of a diameter 10 µm, pitch type made by Petoka Co. Ltd. , or IM 40, 6K grade of a diameter 7 µm, PAN (polyacrylonitrile) type made by TOHO RAYON CO., LTD) was mounted on a spool stand, passed through the impregnating solution charged in the impregnating-solution reservoir at a winding speed of 3 cm/see to uniformly impregnate the carbon fibers with the impregnating solution, and the carbon fiber holding the impregnating solution was wound up around a winding drum.

Hot blast heated at 40°–50° C. was supplied to the carbon fiber before being wound around the drum to volatilize toluene from the carbon fiber, and the carbon fiber was wound under a state in which adhesive property was given to polysilastyrene. The carbon fiber having adhesive property is wound around the winding drum. Hence, in order to be able to easily remove a laminated body of the carbon fiber, a fluoro resin treatment and the like may be performed at portions contacting the laminated body.

The laminated body of the carbon fiber removed from the winding drum was cut into an arbitrary shape, and then subjected to press forming by biaxial-pressure pressing, or cold or warm isostatic pressing (C.I.P or W.I.P) to provide a formed body. The formed body was then held in a furnace maintained at 50° C. for 24 hours to completely volatilize toluene.

Subsequently, conversion into the nonmeltable state of the polysilastyrene contained in the formed body was performed. That is, the formed body was processed at a temperature gradient of 3.5° C./hour under a pressurized N$_2$ gas (about 5 kgf/cm$^2$ G) up to 600° C. to be completely vitrified.

Upon sintering the formed body, a fine powder of boron nitride was applied on the surface of the formed body which had been subjected to degreasing processing to provide masking. The formed body thus prepared was heated at a temperature gradient of 200° C./hour under a pressurized gas (9 kgf/cm$^2$ G in the case of nitrogen gas, and 2 kgf/cm² G in the case of argon gas), arid sintering was performed under conditions of at a temperature of 1650° C. and for 1 hour.

For the purpose of comparison, an impregnating solution not using organometallic macromolecular substance was prepared as an conventional example, and laminated bodies of impregnated carbon fibers of the pitch type and the PAN type were provided by the same method as described above, cut arid subjected to press forming in the same manner as described above to provide formed bodies. The formed bodies were converted into the nonmeltable state under the same conditions as described above, and then sintered to provide sintered bodies.

Flexural strength and the value of fracture toughness $K_{Ic}$ of the sintered bodies of the inventive examples and conventional examples thus obtained were measured. The results are shown in Table A1

TABLE A1

| Classification | kind of fibers | Flexural strength (kgf/mm²) | $K_{Ic}$ (MN/m$^{3/2}$) |
|---|---|---|---|
| Inventive example | Pitch type | 8.7 | 3.2 |
| conventional example | Pitch type | 6.1 | 2.2 |
| Inventive example | PAN type | 8.5 | 3.0 |
| conventional example | PAN type | 6.0 | 2.1 |

As is apparent from Table A1, in the pitch type, both flexural strength and the value of fracture toughness of examples of the first aspect of the present invention have increased by about not less than 40% compared with those of conventional examples. Also in the PAN type, high values about not less than 40% compared with those of conventional examples were obtained in both flexural strength and the value of fracture toughness. Effects of the present invention were thus confirmed.

Example A2

In order to prevent surface oxidation of the carbon fibers (the pitch type and the PAN type) identical to those used in Example A1, silicon carbide was deposited on surfaces of the fibers by a chemical vapor deposition (CVD). Using these carbon fibers, sintered bodies were obtained keeping the composition of an impregnating solution, winding conditions, and degreasing and sintering conditions identical to those in Example A1.

For the purpose of comparison, carbon fibers identical to those in Example A1 were used, immersed in an impregnating solution dissolving no organometallic macromolecular substance, wound tip, and Subjected to degreasing and sintering under conditions identical to those in Example A1 to obtain sintered bodies of conventional examples.

Flexural strength and the value of fracture toughness of the sintered bodies of the present inventive examples and conventional examples thus obtained were measured. The results are shown in Table A2.

TABLE A2

| Classification | kind of fibers | Flexural strength (kgf/mm²) | $K_{Ic}$ (MN/m$^{3/2}$) |
|---|---|---|---|
| Inventive example | Pitch type | 9.6 | 3.5 |
| conventional example | Pitch type | 6.7 | 2.5 |
| Inventive example | PAN type | 9.4 | 3.4 |
| conventional example | PAN type | 6.6 | 2.4 |

As can be understood from Table A2, in the entional examples, flexural strength is 6.7 kgf/mm² and the value of fracture toughness is 2.5 MN/m$^{3/2}$ in the pitch type, and flexural strength is 6.6 kgf/mm² and the value of fracture toughness is 2.4 MN/m$^{3/2}$ in the PAN type. On the other hand, in the present inventive examples, flexural strength is 9.6 kgf/mm² and the value of fracture toughness is 3.5 MN/m$^{3/2}$ in the pitch type, and flexural strength is 9.4 kgf/mm² and the value of fracture toughness is 3.4 MN/m$^{3/2}$ in the PAN type. Hence both flexural strength and the value of fracture toughness were remarkably improved, and effects of the present invention could be confirmed.

EXAMPLE A3

64.6 g of polysilazane made by Chisso Corporation (Product Name; NCP-200, contains 65% toluene solution, not stoichiometric) was dissolved in 87.4 g of toluene as a solvent. The solution was held in a separately-prepared polyethylene pot having an inner volume of 500 cc, and 98 g of mullite powder (made by KYORITSU CERAMIC MATERIALS CO., LTD, Product Name; KM Mullite) was added thereto. 300 g of high-alumina-quality cylinder-type pellets having 12.5 mm$\phi$ were added thereto, the lid of the pot was then closed, the pot was rotated at 50 r.p.m, and an impregnating solution was prepared followed by mixing for 16 hours.

The impregnating solution was poured into an impregnating-solution reservoir, a carbon fiber (HM-60, 2K grade with a diameter of 10 μm, pitch type made by Petoka CO. LTD., or IM 40, 6K gradewith a diameter of 7 μm, PAN (polyacrylonitrile) type made by TOHO RAYON CO., LTD) was mounted on a spool stand, passed through the immersing solution in the impregnating-solution reservoir at a winding speed of 3 cm/sec to uniformly impregnate the impregnating solution into the carbon fiber, and the carbon fiber holding the impregnating solution was wound up around a winding drum.

Subsequently, lamination, degreasing and sintering were performed under conditions identical to those in Example A1 to obtain sintered bodies of the present inventive examples. For the purpose of comparison, as conventional examples, an impregnating solution dissolving no polysilazane was prepared, and sintered bodies of conventional examples were obtained in the same manner. Flexural strength and the value of fracture toughness of sintered bodies of the present inventive examples and conventional examples were measured. The results are shown in Table A3.

TABLE A3

| Classification | kind of fibers | Flexural strength (kgf/mm²) | $K_{Ic}$ (MN/m$^{3/2}$) |
|---|---|---|---|
| Inventive example | Pitch type | 7.8 | 2.9 |
| conventional example | Pitch type | 5.5 | 2.0 |
| Inventive | PAN type | 7.7 | 2.7 |

TABLE A3-continued

| Classification | kind of fibers | Flexural strength (kgf/mm$^2$) | K$_{Ic}$ (MN/m$^{3/2}$) |
|---|---|---|---|
| example conventional example | PAN type | 5.4 | 1.9 |

As can be understood from Table A3. In conventional examples, flexural strength is 5.5 kgf/mm$^2$ and the value of fracture toughness is 2.0 MN/m$^{3/2}$ in the pitch type, and flexural strength is 5.4 kgf/mm$^2$ and the value of fracture toughness is 1.9 MN/m$^{3/2}$ in the PAN type. On the other hand, in the present inventive examples, flexural strength is 7.8 kgf/mm$^2$ and the value of fracture toughness is 2.9 MN/m$^{3/2}$ in the pitch type and flexural strength is 7.7 kg f/mm$^2$ and the value of fracture toughness is 2.7 MN/m$^{3/2}$ in the PAN type. Hence, high values of about 40% in both flexural strength and the value of fracture toughness superior to those of the conventional examples can be obtained, arid effects of the present invention could been confirmed.

EXAMPLE A4

In order to prevent surface oxidation of the carbon fibers (the pitch type and the PAN type) identical to those used in Example A3, silicon carbide was deposited on the surface of the fibers by a chemical vapor deposition (CVD). Using these carbon fibers, sintered bodies were obtained keeping the composition of an impregnating solution identical to that in Example A3, and winding conditions and degreasing and sintering conditions identical to those in Example A1.

For the purpose of comparison, as conventional examples, carbon fibers identical to those in Example A3 were used, immersed into an impregnating solution dissolving no organometallic macromolecular substance, wound, and subjected to degreasing and sintering under conditions identical to those in Example A1 to obtain sintered bodies.

Flexural strength and the value of fracture toughness of the sintered bodies of the present inventive examples and conventional examples thus obtained were measured. The results are shown in Table A4.

TABLE A4

| Classification | kind of fibers | Flexural strength (kgf/mm$^2$) | K$_{Ic}$ (MN/m$^{3/2}$) |
|---|---|---|---|
| Inventive example | Pitch type | 8.6 | 3.2 |
| conventional example | Pitch type | 6.0 | 2.2 |
| Inventive example | PAN type | 8.5 | 3.1 |
| conventional example | PAN type | 5.9 | 2.1 |

As is apparent from Table A4, flexural strength and the value of fracture toughness of both the pitch type and the PAN type of the present inventive examples show values which are superior to those of conventional examples by about 40%, and effects of the present invention were confirmed.

EXAMPLE 5

Although, in Examples A1–A4, test results on composite materials using carbon fibers have been shown, in the present embodiment, a tungsten fiber which is superior to a carbon fiber in strength, modulus of elasticity, melting point and decomposition point was used. Since a tungsten fiber causes grain growth when heated at 1300° C. or above and becomes easily cut off, a fiber which does not cause grain growth by heating was used, i.e., a fiber doped with thoria (ThO$_2$) by 2.5% was used.

The tungsten fiber used was made by NIPPON TUNGSTEN CO., LTD, and had a diameter of 50 μm. Since time is required if fibers are wound one by one by the filament winding method, 50 fibers were bundled, passed through an impregnating-solution reservoir containing an impregnating solution and wound around a winding drum.

As impregnating solutions, two preparations, that is, a system in which silicon nitride is mixed in polysilastyrene shown in Example A1, and a system in which silicon nitride is mixed in polysilazane shown in Example A3 were used. Sintered bodies were obtained making winding conditions, degreasing and sintering conditions identical to those in Example A1 or Example A3. For the purpose of comparison, as conventional examples, an impregnating solution dissolving rio organometallic macromolecular substance was used, and impregnated into tungsten fibers. Subsequently, degreasing and sintering were performed under the same conditions to prepare sintered bodies of conventional examples.

Flexural strength and the value of fracture toughness of sintered bodies of the present inventive examples and conventional examples thus obtained were measured. The results are shown in Table A5.

TABLE A5

| Classification | Kind of impregnating solution | Flexural strength (kgf/mm$^2$) | K$_{Ic}$ (MN/m$^{3/2}$) |
|---|---|---|---|
| Inventive example | Example 1 | 8.2 | 3.0 |
| Inventive example | Example 3 | 8.0 | 2.95 |
| conventional example | none | 5.6 | 2.1 |

As is apparent from Table A5, in the present inventive examples, flexural strength and the value of fracture toughness have values superior to those of conventional examples by more than 40% in the polysilastyrene system, and flexural strength and the value of fracture toughness also have values superior to those of conventional examples by more than 40% in the polysilazane system. thus, effects of the present invention were confirmed.

EXAMPLES B1–B5 (SECOND ASPECT)

Example B1

A formed body was prefered, converted into the nonmeltable state, degreased and applied with a fine boron nitride powder to provide masking in the same manner as Example A1. In this Example B1, the resultant formed body was placed ill a carbon mold and press sintered by heating at a temperature gradient, of 600° C./hr in an argon gas flow up to 1650° C. and holding it for one hour under a pressure of 350 kgf/cm$^2$ G.

For the purpose of comparison, an impregnating solution using no organometallic macromolecular substance was prepared as an conventional example, and laminated bodies of impregnated carbon fibers of the pitch type and the PAN type were provided by the same method as described above, cut and subjected to press forming in the same manner as described above to provide formed bodies. The formed bodies were converted into the nonmeltable state under the same conditions as described above, and then sintered in a pressurized argon gas atmosphere under the same conditions as Example A1 to provide sintered bodies.

Flexural strength and the value of fracture toughness $K_{Ic}$ of the sintered bodies of the inventive examples of the 2nd aspect and conventional examples thus obtained were measured. The results are shown in Table B1, together with the results of Example A1 for comparative purpose.

TABLE B1

| Classification | kind of fibers | Flexural strength (kgf/mm²) | $K_{Ic}$ (MN/m$^{3/2}$) |
|---|---|---|---|
| Aspect 2 | Pitch type | 41.3 | 14.4 |
| Inventive example A1 | Pitch type | 8.7 | 3.2 |
| conventional example | Pitch type | 6.1 | 2.2 |
| Aspect 2 | PAN type | 38.5 | 13.8 |
| Inventive example A1 | PAN type | 8.5 | 3.0 |
| conventional example | PAN type | 6.0 | 2.1 |

As is apparent from Table B1, in the pitch type, the flexural strength is about 6.8 times of the conventional one and about 4.7 times of Example A1, and the value of fracture toughness of examples of the second aspect of the present invention is about 6.4 times of conventional examples and about 4.5 times of Example A1. Also in the PAN type, the flexural strength and the value of fracture toughness is about 6.8 times of the conventional and about 4.6 times of Example A1. Effects of the present aspect were thus confirmed.

Example B2

In order to prevent surface oxidation of the carbon fibers (the pitch type and the PAN type) identical to those used in Example A1, silicon carbide was deposited on surfaces of the fibers by a chemical vapor deposition (CVD). Using these carbon fibers, sintered bodies were obtained keeping the composition of an impregnating solution, winding conditions, and degreasing and sintering conditions identical to those in Example B1.

For the purpose of comparison, an impregnating solution not using organometallic macromolecular substance was prepared as an conventional example, and laminated bodies of impregnated carbon fibers of the pitch type and the PAN type were provided by the same method as described above, cut and subjected to press forming in the same manner as described above to provide formed bodies. The formed bodies were converted into the nonmeltable state tinder the same conditions as described above, and then sintered in a pressurized argon gas atmosphere under the same conditions as Example A1 to provide sintered bodies.

Flexural strength and the value of fracture toughness of the sintered bodies of the present inventive examples and conventional examples thus obtained were measured. The results are shown in Table A2 together with the results of Example A2 for the purpose of comparison.

TABLE B2

| Classification | kind of fibers | Flexural strength (kgf/mm²) | $K_{Ic}$ (MN/m$^{3/2}$) |
|---|---|---|---|
| Aspect 2 | Pitch type | 45.5 | 18.8 |
| Inventive example A2 | Pitch type | 9.6 | 3.5 |
| conventional example | Pitch type | 6.7 | 2.5 |
| Aspect 2 | PAN type | 42.4 | 15.1 |
| Inventive example A2 | PAN type | 9.4 | 3.4 |
| conventional example | PAN type | 6.6 | 2.4 |

As can be understood from Table B2, flexural strength is about 6.8 times of the conventional and about 4.7 times of Example A2, arid the value of fracture toughness is about 7.5 tunes of the conventional and about 5.4 times of Example A2, respectively, in the pitch type. In the PAN type, in the present aspect examples, flexural strength is about 6.4 times of the conventional and about 4.5 times of Example A2, and the value of fracture toughness is about 6.3 times of the conventional and about 4.4 times of Example A2. Hence both flexural strength and the value of fracture toughness were significantly improved, and effects of the present aspect could be confirmed.

Example B3

Carbon fiber was impregnated and wound up in the same manner as in Example A3. Subsequently, lamination, degreasing and sintering were performed under conditions identical to those in Example B1 to obtain sintered bodies of the present aspect examples.

For the purpose of comparison, an impregnating solution not using organometallic macromolecular substance was prepared as an conventional example, and laminated bodies of impregnated carbon fibers of the pitch type and the PAN type were provided by the same method as described above, cut and subjected to press forming in the same manner as described above to provide formed bodies. The formed bodies were converted into the nonmeltable state under the same conditions as described above, and then sintered in a pressurized argon gas atmosphere under the same conditions as Example A1 to provide sintered bodies. Flexural strength and the value of fracture toughness of sintered bodies of the present aspect examples and conventional examples were measured. The results are shown in Table B3 together with the results of Example A3 for the purpose of comparison.

TABLE B3

| Classification | kind of fibers | Flexural strength (kgf/mm²) | $K_{Ic}$ (MN/m$^{3/2}$) |
|---|---|---|---|
| Aspect 2 | Pitch type | 37.2 | 13.0 |
| Inventive example A3 | Pitch type | 7.8 | 2.9 |
| conventional example | Pitch type | 5.5 | 2.0 |
| Aspect 2 | PAN type | 34.7 | 12.5 |
| Inventive example A3 | PAN type | 7.7 | 2.7 |
| conventional example | PAN type | 5.4 | 1.9 |

As can be understood from Table B3, the flexural strength is about 6.8 times of the conventional and about 4.8 times of Example A3, the value of fracture toughness is about 6.5 times of the conventional and about 4.5 times of Example A3 in the pitch type. Tn the PAN type, on the other hand, the present aspect examples show a flexural strength of about 6.4 times and about 4.5 times of Example A3, and the value of fracture toughness is about 6.8 times of the conventional and about 4.6 times of Example A3. hence the effects of the present aspect could been

Example B4

In order to prevent surface oxidation of the carbon fibers (the pitch type and the PAN type) identical to those used in Example B1, silicon carbide was deposited on the surface of the fibers by a chemical vapor deposition (CVD). Using these carbon fibers, sintered bodies were obtained keeping the composition of an impregnating solution identical to that in Example B1, and winding conditions and degreasing and sintering conditions identical to those in Example B1.

For the purpose of comparison, an impregnating solution not using organometallic macromolecular substance was prepared as an conventional example, and laminated bodies of impregnated carbon fibers of the pitch type and the PAN type were provided by the same method as described above, cut and subjected to press forming in the same manner as described above to provide formed bodies. The formed bodies were converted into the nonmeltable state under the same conditions as described above, and then sintered in a pressurized argon gas atmosphere under the same conditions as Example A1 to provide sintered bodies.

Flexural strength and the value of fracture toughness of the sintered bodies of the present aspect examples and conventional examples thus obtained were measured. The results are shown in Table B4 together with the results of Example A4.

TABLE B4

| Classification | kind of fibers | Flexural strength (kgf/mm$^2$) | $K_{Ic}$ (MN/m$^{3/2}$) |
|---|---|---|---|
| Aspect 2 | Pitch type | 41.0 | 14.2 |
| Inventive example A4 | Pitch type | 8.6 | 3.2 |
| conventional example | Pitch type | 6.0 | 2.2 |
| Aspect 2 | PAN type | 38.2 | 13.6 |
| Inventive example A4 | PAN type | 8.5 | 3.1 |
| conventional example | PAN type | 5.9 | 2.1 |

As is apparent from Table B4, the flexural strength is about 6.8 times of the conventional and about 4.8 times of Example A4, and the value of fracture toughness of the present aspect examples is about 6.5 times of the conventional and about 4.4 times of Example A4, respectively in the pitch type. In the PAN type, the flexural strength is about 6.5 times of the conventional and about 4.5 times of Example A4, and the value of fracture toughness is about 6.5 times of the conventional and about 4.4 times of Example A4.

Example 5

Although, in Examples B1-B4, test results on composite materials using carbon fibers have been shown, in the present embodiment, a tungsten fiber which is same as that used in Example A5 was vised and wound around a winding drum.

As impregnating solutions, two preparations, that is, a system in which silicon nitride is mixed in polysilastyrene shown in Example B1, and a system in which silicon nitride is mixed in polysilazane shown in Example A3 were used. Sintered bodies were obtained making winding conditions, degreasing and sintering conditions identical to those in Example B1 or Example B3. For the purpose of comparison, as conventional examples a formed body obtained in the same manner, as Example A5 was subjected to conversion into nonmetable state followed by sintering in a pressurized argon gas atmosphere under the same conditions as Example A1.

Flexural strength and the value of fracture toughness of sintered bodies of the present aspect examples and conventional examples thus obtained were measured. The results are shown in Table B5 together with the results of Example A5.

TABLE B5

| Classification | Kind of impregnating solution | Flexural strength (kgf/mm$^2$) | $K_{Ic}$ (MN/m$^{3/2}$) |
|---|---|---|---|
| Aspect 2 | Example 1 | 40.3 | 13.9 |
| Aspect 2 | Example 3 | 37.8 | 13.3 |
| Inventive example A5 | Example 1 | 8.2 | 3.0 |
| Inventive example A5 | Example 3 | 8.0 | 2.95 |
| conventional example | none | 5.6 | 2.1 |

As is apparent from Table B5, in the present inventive examples, the flexural strength for the polysilastyren system impregnating solution of Example a1 is about 7.2 times of the conventional and about 4.9 times of Example A5, and the fracture toughness is about 6.6 times of the conventional and about 4.6 times of Example A5. In the polysilazane system impregnating solution, the flexural strength is about 6.8 times of the conventional and about 4.7 times of Example A5, and the fracture of toughness is about 6.3 times of the conventional and about 4.5 times of Example A5. Thus, effects of the present invention were confirmed.

It should be understood that modifications in the art may be made without departing fi-om the gist and scope of the present invention as herein disclosed and claimed hereinbelow.

What is claimed is:

1. A method of producing a fiber-reinforced ceramic composite material reinforced by a particle dispersion comprising:
    (a) dispersing ceramic particles as a matrix in a solution comprising an organometallic macromolecular substance to form an impregnating solution,
    (b) uniformly impregnating fibers with said impregnating solution,
    (c) laminating the impregnated fibers to provide a laminated body,
    (d) converting the organometallic macromolecular substance impregnated on said fibers of said laminated body into a nonmeltable state, and
    (e) sintering said laminated body in a pressurized or a normal-pressure inert gas and/or nitrogen gas atmosphere.

2. A method of producing a fiber-reinforced ceramic composite material reinforced by a particle dispersion comprising:
    (a) dispersing ceramic particles as a matrix in a solution comprising an organometallic macromolecular substance to form an impregnating solution,
    (b) uniformly impregnating fibers with said impregnating solution,
    (c) laminating said impregnated fibers to provide a laminated body, (d) converting the organometallic macromolecular substance impregnated on said fibers of said laminated body into a nonmeltable state, and (e) press sintering said laminated body in an inert gas and/or nitrogen gas.

3. The method as defined in claim 1 or 2, in which said converting step (d) is performed by thermal decomposition. organometallic macromolecular substance is selected from the group consisting of polysiloxane, polysilazane, polycarbosilane and polysilastyrene.

4. The method as defined in claim 3, in which said thermal decomposition is carried out under an inert or nitrogen containing atmosphere.

5. The method as defined in claim 1 or 2, in which said organometallic macromolecular substance is selected from the group consisting of organosilicon, a sol of metal alkoxide, a gel of metal alkoxide and mixtures thereof.

6. The method as defined in claim 1 or 2, in which said organometallic macromolecular substance is selected from the group consisting of polysiloxane, polysilazane, polycarbosilane and polysilastryrene.

7. The method as defined in claim 1 or 2, in which said fibers are impregnated with said impregnating solution in an amount which forms ceramic fine particles upon press sintering in an amount of 20-25 volume %.

8. The method as defined in claim 1 or 2, or in which the fibers are present in an amount of 30-40 volume %.

9. The method as defined in claim 1 or 2, in which said mullite particles have an average grain size of about 1 µm or above before sintering.

10. The method as defined in claim 1 or 2, in which said mullite particles have an average grain size of 1-1.5 µm before sintering.

11. The method as defined in claim 1 or 2, in which the sintering is performed at a temperature ranging from 1450°-1750° C.

12. The method as defined in claim 1 or 2, in which the sintering is performed at about 1650° C.

13. The method as defined in claim 2, in which the press sintering is performed tinder a pressure of at least 10 kgf/mm².

14. The method as defined in claim 1 or 2, in which said fibers are fibers having heat resistance under sintering selected from the group consisting of carbon fiber, ceramic fiber, glass fiber, metal fiber, whisker and mixtures thereof.

15. The method as defined in claim 1 or 2, in which said fibers are selected from the group consisting of carbon fibers and tungsten fibers and mixtures thereof.

16. The method as defined in claim 6, in which said organometallic macromolecular substance is selected from the group consisting of polysilazane and polysilastyrene.

17. The method as defined in claim 15, in which said fibers comprise carbon fibers which are coated with silicon carbide by CVD.

18. The method as defined in claim 5, in which said fibers comprise tungsten fibers which are doped with thoria.

19. The method as defined in claim 1 or 4, in which the laminating step (c) is performed by winding the resultant fibers of step (b) on a drum.

20. The method as defined in claim 1 or 2, wherein, before the laminating step (c), the impregnated fibers of step (b) are dried to make the fibers tacky.

21. The method as defined in claim 1 or 2, wherein after the laminating step (c), press forming is applied.

22. The method as defined in claim 1 or 2, in which the converting step (d) is performed under the conditions such that the organometallic macromolecular substance is thermally decomposed resulting in a vitrified ceramic coating layer on the surface of mullite particles.

23. The method as defined in claim 22, in which the converting step (d) is performed by heating up to 600°-800° C.

24. The method as defined in claim 19, in which said wound fibers are cut into pieces of a desired shape.

25. The method as defined in claim 24, in which said cut pieces are subjected to press forming.

26. The method as defined in claim 1 or 2, in which the step (b) is performed by continuously passing the fibers through said impregnating solution.

27. The method as defined in claim 1 or 2, in which the fibers are continuous filaments.

28. The method as defined in claim 1 or 2, wherein said ceramic particles comprise mullite particles.

* * * * *

UNITED STATES PATENT AND TRADEMARK OFFICE
CERTIFICATE OF CORRECTION

PATENT NO. : 5,294,387

DATED : March 15, 1994

INVENTOR(S) : Kikuo NAKANO, Kenji OSHIMA, Misao IWATA, Takao YAMADA

It is certified that error appears in the above-identified patent and that said Letters Patent is hereby corrected as shown below:

On title page, item [73] should read as follows:

Assignee: Agency of Industrial Science and Technology, Tokyo, Japan, and
Noritake Co., Limited, Nagoya, Japan Signed and Sealed this Twenty-seventh Day of September, 1994

Attest:

BRUCE LEHMAN

Attesting Officer

Commissioner of Patents and Trademarks